O. ANDERSON.
LUBRICATOR.
APPLICATION FILED MAR. 18, 1914.
1,200,571.
Patented Oct. 10, 1916.
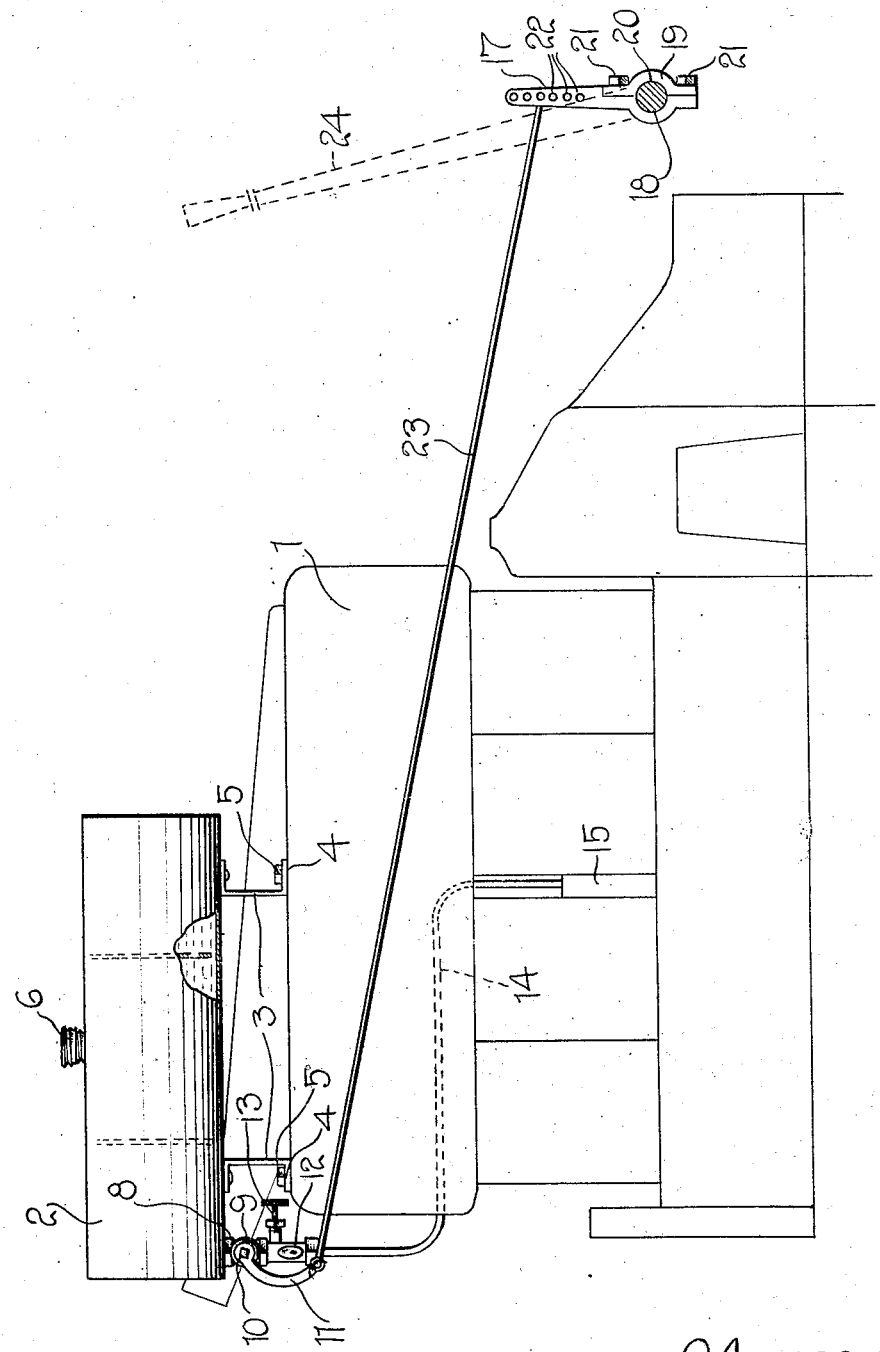
Witnesses
Robert M. Sutphen
A. L. Hind
Inventor
O. Anderson
By Watson E. Coleman
Attorney

UNITED STATES PATENT OFFICE.

ORLAF ANDERSON, OF WAUSAU, WISCONSIN.

LUBRICATOR.

1,200,571.

Specification of Letters Patent.

Patented Oct. 10, 1916.

Application filed March 18, 1914. Serial No. 825,630.

*To all whom it may concern:*

Be it known that I, ORLAF ANDERSON, a citizen of the United States, residing at Wausau, in the county of Marathon and State of Wisconsin, have invented certain new and useful Improvements in Lubricators, of which the following is a specification, reference being had to the accompanying drawings.

This invention relates to new and useful improvements in lubricating devices and more particularly to a device of this character which is adapted for use upon automobile engines, the main object of the present invention being the provision of a lubricating device whereby the engine will be automatically supplied with oil when the car is in motion, the supply being controlled by the actuation of the emergency brake lever which, when the car is stopped and the lever thrown to an operative position, the supply of oil will be cut off and, when the car is started and the lever thrown to an inoperative position, the supply of oil can be opened.

Another object of the present invention is the provision of a lubricating device of this character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, the figure illustrates in side elevation my improved lubricator as applied to an automobile engine, parts thereof being broken away and shown in section.

In the present instance, I have illustrated my invention as applied to that type of engine, which is used in connection with the "Ford" automobile but it will be understood that my improved lubricating device can be equally as well applied to any make of engine of the same type.

In the accompanying drawing, the numeral 1 indicates the engine and it will be apparent that the reservoir or supply tank 2 which is included in my improved lubricating device, is provided with supporting lugs 3, having angularly disposed perforated feet 4 secured to the lower side thereof. The supply tank 2 is secured to the top and left-hand side of the engine by means of the bolts 5 which are used to hold the cylinder heads of the engine in position. From this, it will be seen that no extra means is provided for securing the supply tank in position. The supply tank is provided with an externally threaded nipple 6, which communicates with the interior of the tank, so that the same may be readily filled, when desired and communicating with the cut off by means of a threaded cap member which is engaged over the nipple 6.

Connected with the supply pipe 2, upon the lower side thereof, at one end, is an outlet pipe 8 in which is arranged a valve 9 having an outwardly projecting stem 10, to which is connected the curved arm 11, the purpose of which will be hereinafter more fully set forth. Connected with the lower end of the outlet pipe 8, is a gage tube 12 and arranged within the gage tube, is a valve 13, whereby the flow of lubricant from the supply tank through the gage tube may be regulated. The gage tube is provided upon opposed sides thereof with transparent covered openings, whereby the drip is plainly visible so that it may be regulated, as desired. Connected with the lower end of the gage tube 12, is a tube 14, which extends around to the right-hand side of the engine and communicates with the breather pipe 15, said breather pipe having communication with the crank case whereby the lubricant from the crank case 2 may be readily conveyed to the crank case.

From this it will be apparent that after the supply of oil has been regulated by means of the valve 13, the supply is automatically cut-off or turned back the actuation of the arm 11. In operating the arm 11, so as to automatically supply the oil to the crank case, I mount upon the emergency brake shaft 16, an upwardly projecting arm 17, the inner end of said arm being provided with an arcuate bearing 18 which is adapted to engage one side of the shaft and is securely held in position by means of the removable plate 19, the central portion of which is arcuately curved, as shown at 20, while the ends thereof are bolted to the inner end of the arm 17, by means of the bolts 21. The outer end of the arm 17 is provided with a plurality of openings 22, whereby the connecting rod 23 may be readily connected therewith, the other end of said rod being connected to the lower end of the arm 11, so that upon the rotation of the shaft 16, the valve 9 will be opened and closed, according to the direction in which the object is rotated.

Connected with the shaft 18, is the emergency brake lever 24 and, from this it will be apparent that when the machine is stopped and the brake lever thrown to its operative position, the shaft will be rotated to close the valve 9 and cut off the supply of lubricant from the crank case but, on the other hand, when the lever is thrown to an inoperative position, the shaft is rotated so that the valve 9 is opened, thus opening communication between the crank case and the supply tank 3. As stated before, the amount of oil to be supplied to the crank case is regulated by means of the valve 13, which is located within the guide stem 10.

While I have shown and described my improved lubricating device as supplied to a specific form of engine, it will be understood that the same may be equally well applied to use in connection with any make of engine of the same type. It will be noted that the same may be readily applied thereto without any other necessary fastening means, than the usual bolts which retain the cylinder head in position. It will also be apparent that I have provided a simple and durable device, whereby the crank case will be automatically supplied with a sufficient amount of lubricant when the machine is in motion and, it will be noted that by providing a supply tank and the above described means for connecting the same with the crank case, it will eliminate the necessity of pouring the oil through the breather pipe by hand, as during this operation more or less of the lubricant is spilled over the engine and will soak the timer connections, causing a short-circuiting. The old method of oiling the engine is by pouring in a large amount of oil with a result that a good share of the same is burnt and wasted, causing the engine to smoke and fouling up the spark plugs. This device is simple in construction and does not need filling any oftener than the gasolene tank, it keeps the parts of the engine free from oil and lessens the danger of fire and avoids the necessity of carrying a high oil level, thus saving the oil and keeps the engine constantly supplied with fresh clean oil, as it is consumed. The device may be cheaply manufactured and placed upon various makes of engines in use in automobiles.

While I have shown and described the preferred form of my invention, it will be obvious that various changes in the details of construction and in the proportions may be resorted to for successfully carrying my invention into practice, without sacrificing any of the novel features or departing from the scope of the appended claims.

Having thus described this invention, what is claimed is:—

1. In lubricating apparatus, the combination with a crank case adapted to contain lubricant, a lubricant reservoir, and a conduit connecting the reservoir and crank case, of a controlling valve in the conduit, and a brake lever connected with said valve for shutting off communication through the conduit simultaneously with the application of the brake.

2. The combination with a supply tank, and a lubricant distributing device, of a valve interposed between the tank and the lubricant distributing device, a valve operating member connected to the valve, an emergency brake lever, and a device connecting said lever and member and compelling them to move together, substantially as described.

3. The combination with a supply tank and a lubricant distributing device, of a valve interposed between the tank and the lubricant distributing device, and a brake lever connected with said valve for shutting off the supply of lubricant to said device simultaneously with the application of the brake.

In testimony whereof I hereunto affix my signature in the presence of two witnesses.

ORLAF ANDERSON.

Witnesses:
  OTTO G. FEHLHABER,
  HELEN SLOAN.